Patented Apr. 9, 1935

1,997,282

UNITED STATES PATENT OFFICE 1,997,282

LIGHT WEIGHT CLAY PRODUCT AND PROCESS OF MAKING

Charles Weigel, Hebron, N. Dak.

No Drawing. Application October 22, 1930, Serial No. 490,536

10 Claims. (Cl. 106—21)

The invention relates to structural ceramic material and to the process of manufacturing the same, the principal object of the invention being to produce such material preferably in brick or block form, which, while possessing great strength and resistance to stress, is of very light weight, and has a high insulating value.

The present application is a continuation in part of my prior application Serial No. 151,028, filed Nov 26, 1926, for Brick and process of manufacturing same.

A further object of the invention is to produce a block which is cellular in structure and which is sound-proof and possessed of fine acoustical properties.

A still further object is to produce a ceramic block into which nails or other fastening means may be driven without cracking or splitting the block.

Still another object is to produce a cellular block in which the size of the cells may be regulated as desired, during the course of manufacture of the block.

A still further object is to provide a block or brick having a very porous face which is especially adapted to receive and retain a plaster or like coating.

Another and very important object of the invention is to produce ceramic material having the above mentioned characteristics from raw materials which may be obtained in large quantities and at relatively low cost, whereby the final product may be cheaply and efficiently manufactured.

Attempts have previously been made to produce lightweight porous blocks particularly designed for their refractory qualities, and intended for use as fire brick, furnace linings or the like. The materials used in the production of such bricks have been particularly selected and combined for their heat resisting qualities, rather than for their strength and adaptability for structural purposes. Where clays have been used as ingredients of such blocks, they have accordingly generally been selected for their high alumina and relatively low silica content, this combination being intended to increase the resistance to heat. So far as I am aware, no successful porous structural light-weight brick has been produced prior to my invention, and the success of the present invention is believed to be due to the careful selection of ingredients, which, after much experimentation, have been found to produce blocks of light weight and great strength sufficient to support the greatest loads they may be called upon to bear.

According to my process, the product is produced from a clay selected for its desirable qualities for this particular purpose, namely the manufacture of light-weight structural brick. The clay is mixed with a lignite, likewise selected for its particular adaptability in the manufacture of the desired product, and with these two ingredients is preferably mixed a suitable quantity of bentonite.

The clay selected should be of good plasticity, and should have good working properties. It should have a sufficient vitrification range so that it can be vitrified without sagging or warping. A clay having excessive shrinkage should be avoided. The clays which have been most successfully used have been silicious clays, that are quite free from impurities, and which have a vitrification range between cones 8 and 20, or between approximately 2237° F. and 2768° F. An average analysis of such clays is given as follows:

|  |  | Range |
|---|---|---|
| Silica ($SiO_2$) | 67.0% | 50–70% |
| Alumina ($Al_2O_3$) | 23.0% | 18–25% |
| Iron oxide ($Fe_2O_3$) | 1.0% | 0.5–1.5% |
| Lime (CaO) | 0.3% | 0.2–0.5% |
| Magnesia (MaO) | 0.5% | 0.3–0.7% |
| Alkalies ($Na_2O$ and $K_2O$) | trace | trace |
| Loss on ignition | 7.0% | 5–9% |

The clays have good plasticity, the shrinkage on drying and firing is low, they have good mechanical strength and the vitrification range is sufficient so they can be burned to low porosity without losing their shape or warping. The fusion temperature of these clays ranges from 2800° F. to 2900° F.

The second important ingredient is lignite. The lignite employed should be hard and strong, so that it may be crushed to a definite particle size. It should be of a character such that it will not disintegrate during the mixing and wetting of the mixture. The fusing temperature of the lignite ash should be between 2000° F. and 2100° F., so that it will act as a flux on the clay without requiring too high a temperature in firing the ware. The size and quantity of the lignite particles may be controlled in the mixture to give the type of ware desired. The lignite should be carefully graded according to size. The quantity of lignite used may vary from 40% to 70% by weight of the total mixture. The size of particles may vary from 0.5 inches to 0.02 inches. The following are average analyses of lignite ash as used:

| | | |
|---|---|---|
| Silica ($SiO_2$) | 21.48% | 22.92 |
| Alumina ($Al_2O_3$) | 11.38% | 18.18 |
| Iron oxide ($Fe_2O_3$) | 14.40% | 7.54 |
| Calcium oxide (CaO) | 19.06% | 19.96 |
| Magnesium oxide (MgO) | 7.26% | 5.28 |
| Sodium and Potassium (as chlorides) | 13.17% | 22.70 |
| Fusion temperature of ash | 2095° F. | 2082° F. |
| Per cent ash in lignite as mined | 6.59% | 5.34% |

The lignite used is selected for the low fusion temperature of its ash as well as for its hardness. Such lignite is available in large quantities in the State of North Dakota, and in its natural state contains a large percentage of alkalies, which, when the lignite is burned, results in an ash having a high alkaline content which is desirable in the production of the final ceramic product. It is broken by crushing into particles ranging in size from one-half inch to two-hundredths inch and screened. The fragments are as a rule about twice as long in one dimension as in the other two. As a result, they interlock and touch when the product is formed. When the lignite is burned out during the firing of the ware, the openings left where the lignite particles were are found to be connected at the ends and walled on the sides with a vitreous coating formed by the fusion of the lignite ash and the other ingredients of the body of the ware. Since about fifty per cent by weight of the mixture is made up of lignite, which has a specific gravity of about 1.2, while the clay substance has a specific gravity of about 1.9, the mixture by volume, therefore, contains more than fifty per cent of lignite, and when the lignite has been burned out there are many of the connected openings lying between thin walls of vitreous material.

Bentonite is used in smaller quantities in combination with the two above mentioned principal ingredients up to 10% by weight of the clay. Bentonite is a mineral of a colloidal nature and clay-like properties, but has a much greater plasticity and much higher shrinkage. It is made up of minerals not found in clay to any great extent. The analysis approaches that of a clay, and there is the same variation in composition in bentonites as in clays. Its fusion temperature ranges from about 2100° F. to 2300° F. It is used only in small quantities because of its high shrinkage on drying. In amounts up to 10% of the weight of the clay used, it adds greatly to the plasticity of the mixture, increases the mechanical strength of the dry ware and also of the fired ware. It acts as a flux with the clay and lowers the temperature required for vitrifying the body of the ware. Its use permits the use of larger quantities of the crushed lignite and the obtaining of a body of ware of greater porosity.

The process of manufacture varies somewhat with the particular product to be obtained, but broadly speaking is as follows:

The clay is pulverized and to it is added pulverized bentonite. The lignite is crushed and screened and the size of the particles is definitely controlled in this manner. The proper quantities of lignite, clay and bentonite are thoroughly mixed in a dry condition and are then made plastic by the addition of water, and the ingredients thoroughly pugged or mixed. The ware is then formed by any plastic process. Most of the desired products may be made on an auger machine, where the clay is forced out through a die in the desired shape and cut off to the proper length. The ware may then be dried in a common manner, but the drying requires less time than usual, due to the large quantity of the lignite present. After being dried, the product is placed in a kiln and fired. Sufficient air for oxidation of the combustible material in the ware must be supplied and sufficient time allowed to permit oxidation to take place before the temperature is raised to that required for vitrification of the ware.

The structural ceramic material produced thereby is light in weight and yet sufficiently strong to carry the loads to which it may be subjected. The body of the material is full of cells which are interconnected and whose size and number may be controlled by suitably regulating the size and quantity of the lignite employed. By removing the surface skin and exposing the outer cells, a material is produced which acts as an absorber of sound. The absorbing of sound of varying pitches may be controlled by varying the size and number of cells. By vitrifying the ware, thus providing a veneer or surface skin, a ware may be produced which is capable of resisting absorption of water and which is also resistant to the ordinary abrasion to which such materials are subjected in use.

The ware may be made into structural units of various sorts and has the advantage of having very low weight, great strength and resistance to weather. It may be used as a wall surfacing on the interior of buildings to absorb sounds and to reduce reverberation. It may be used in various forms and in various ways for the absorption of sound under various conditions. It may be used in the form of a hollow cylinder to absorb the sound from the exhaust of internal combustion engines. It may be used in making building brick with or without a vitrified veneer on the face. It may be employed also in the manufacture of hollow tile, solid tile, partition tile and partition blocks.

This type of ceramic structural material fulfills a long-felt need, in that it reduces the load on building or other structures, and consequently reduces the cost of construction by requiring less massive foundations and frames for carrying loads. The material is fire-proof, strong, durable, and resists the natural destructive forces to which such materials are ordinarily exposed, such as water, snow, sleet, wind, dust, gases, etc.

The excellent sound absorbing qualities of the ware are apparently due to the numerous connected pores or openings present in the ware. This has been proved by actual tests. So far as I am aware, no similar fired structural ceramic material has been developed prior to the present invention. No sound absorbing material is at present available having the qualities of the present product, namely fire-proofness, resistance to abrasion, water-proofness and a natural surface finish combined with high sound absorbing properties.

While it is true that other materials have been proposed employing carbonaceous material as an initial ingredient for the purpose of forming pores in the finished material, nevertheless such carbonaceous materials have been used in more finely divided form and in smaller amounts than in the present invention, so that the resulting product, although lighter in weight than a solid unit of the same size, was filled with pores or cells of small size which were not connected. The weight of previous units might be from 15% to 30% less than the corresponding size of ordinary brick. The porosity and lightness of previous materials could not be increased substantially beyond the 30% limit without so weakening the brick that it became no longer available for structural purposes. According to the present invention, the weight of the unit may be reduced from 35% to 70% as compared with the weight of an ordinary brick, while at the same time possessing great strength, making it available for any structural uses. This is due to the fusing effect which takes place between highly alkaline lignite and the clay containing a high silica content, combined with the use of a smaller quantity of bentonite up to 10% by weight of the clay. In the present product the pores or openings are connected and offer no obstruction to the passage of air and sound. By placing a block to the mouth and blowing on it, the air escapes in all directions.

The following products may be mentioned as illustrative of the type of article which may be manufactured from material made in accordance with my invention:

*Common brick.*—These may be made in larger sizes than the standard brick because of their lower weight. Accordingly the laying of brick using the product produced according to the present invention is greatly facilitated. Moreover, the brick, due to the large pores in the face of the material, bond well with the mortar. Plaster or stucco will adhere to this type of brick much more readily than to ordinary brick because of the pores or openings.

*Face brick.*—These may also be made in larger size than standard brick. The face may be veneered with a vitreous coating to exclude moisture. Face brick manufactured in accordance with my invention possesses the advantages of lower weight, greater strength and better insulation than ordinary materials employed.

*Hollow tile.*—Hollow tile produced from materials manufactured in accordance with the present invention are light in weight and can be sawed and will hold nails. The nails can be driven into the tile without splitting, and the material will grip the nails as wood does. The tile will hold stucco or plaster well and may be veneered and finished on the exposed surface so that no other finish or surface is necessary.

*Partition tile.*—Such tiles produced in accordance with my invention may be made in larger sizes than ordinary because of their low specific gravity. The tiles may be made so that they require no other surface finish and thus serve to cheapen construction. Such tiles are found to absorb noises and sounds. The tile may easily be dressed to plane surfaces and exact dimensions. Moreover, the mortar joints may be very thin. The material is fire-proof, water-proof and a good insulator for heat and sound.

*Wall tile.*—These may be made with a vitreous veneer finish. Wall tiles prepared in accordance with my invention have the advantage of low weight and the mortar or cement adheres to them much better than to ordinary tiles. The tile may be used either on interiors or exteriors.

*Terra-cotta body.*—The body of terra-cotta may be made of porous ceramic material produced in accordance with my invention, resulting in reduced weight and insuring better adherence to mortar or cement. The surface may be veneered and treated as desired.

*Acoustic tile.*—Such tile may be made with pores or openings of exactly regulated size. Such tiles absorb the noises or sounds within buildings, class-rooms, auditoriums, halls, offices, hospitals and hotels. The tile may be made with whatever thickness or size is necessary. The tile may be so finished on the exposed surface as to require no further surface treatment. Such tile is fireproof, water-proof and an absorber of heat and sound. A specific example of the use of such acoustic tile is on the muffler of an internal combustion engine.

For the purpose of more fully understanding the invention, a specific example of the production of a particular product is given by way of illustration. The particular product produced according to this example is an acoustic tile of rectangular cross section having a finished size of 2 inches x 12 inches x 12 inches, with smooth and plane surfaces to permit the use of very narrow joints in laying the tile.

*Example.*—To make this acoustic tile, I take 475 lbs. of clay, 25 lbs. of bentonite and 500 lbs. of lignite, with the lignite particles all finer than 8 mesh and coarser than 28 mesh, and 75 per cent of the particles finer than 12 mesh and coarser than 20 mesh.

The composition of the clay used is as follows: Silica 66.5%, alumina 23.3%, iron oxide 1.1%, lime 0.3%, magnesia 0.6%, alkalies a trace. The clay burns to a cream white at cone 14, where it is vitrified. Its fusion temperature is cone 22.

The composition of the bentonite used is as follows: Silica 67.8%, alumina 18.2%, iron oxide 6.0%, lime 1.9%, magnesia 0.9%, sodium oxide 0.65%. Its fusion point is at cone 7.

The lignite used contains about 35.0% moisture and about 6.6% ash. The analysis of the ash is: Silica 21.5%, alumina 11.4%, iron oxide 14.4%, lime 19.0%, magnesia 7.3%, alkalies 10.1%. The fusion temperature of the ash is 2095° F.

I thoroughly mix the bentonite with the clay in a dry condition and then the sized lignite is added and thoroughly mixed dry with the other ingredients.

Sufficient water is then added and the mixing continued until the mass is plastic and coherent and of the proper temper to work well in an auger press, which is used in forming the ware.

The plastic mixture is fed to the press and is extruded through the die of the press in a column of the size desired. The column is then run on a cutting table and cut to the desired lengths. The tile are sufficiently strong and rigid to be handled and are placed on the racks of a drier car. When the car is loaded, it is transferred to the drier and the tiles are completely dried in twenty-four hours.

The dried tiles are then transferred to the kiln. A rectangular downdraft kiln of the periodic type may be used, but preferably a tunnel kiln may be employed because of its better control. Because of the large amount of combustible matter in the ware it is necessary to stack it in the kiln so that all the faces except the bottom are exposed to the atmosphere of the kiln. This makes it necessary to use racks of refractory material or posts and shelves such as are used in kilns for stacking many other ceramic wares.

The temperature of the kiln is raised gradually to the temperature at which the combustion of the lignite commences (a low red heat) (about 1100° F.). The temperature is held at this point and the kiln atmosphere so controlled that oxidation of the lignite in the ware will take place at the proper rate. After oxidation of the lignite has been completed, the temperature is raised more rapidly to the temperature required to vitrify the clay body of the ware (about 2200° F.).

After the ware has been vitrified, it is allowed to cool gradually until the kiln can be opened and the ware removed. The ware after removal from the kiln is dressed on a dressing wheel to proper dimension and to smooth plane surfaces. At the same time the outer skin is removed so that the pores or openings are uncovered.

The ware has the following physical characteristics: (1) It is greyish white in color; (2) it is harder than steel; (3) the surface is plane, but pitted with holes varying in size from 0.02 inch to 0.25 inch; (4) the weight of a 2″ x 12″ x 12″ tile averages about 9.5 lbs.; (5) the tiles have a crushing strength of 1800 lbs. per square inch.

When examined under a magnifying glass, the walls or partitions between the cells are seen to be made up of a vitreous, glossy material formed by the fusion of the lignite ash upon the surface of the clay and bentonite mixture. The cells are angular and connected, due to the interlocking of the lignite particles during the forming of the ware.

When tested for sound absorption, the tile absorbed 53.0 units at 512 cycles.

Approximately 60% of the surface and 60% of the volume is made up of cells or openings.

The lignite ash has a low fusion temperature, and as it fuses it attacks the wall of the clay-bentonite mixture and forms a glassy coating over its surface.

The bentonite acts as a flux on the clay with which it is mixed, and serves to vitrify it at a temperature lower than the vitrification temperature of the clay.

Vitrification of the ware serves to make it hard, strong, water-proof and durable.

The improved ceramic material is characterized by its lightness combined with great strength. The strength is apparently due to vitreous or glassy films formed throughout the body of the material, due to the reaction between the highly alkaline fusible ash resulting from the burning of the lignite with the high silica clay, preferably in combination with the bentonite, which acts as a flux and reduces the temperature at which the ware must be fired to become vitrified.

These films form around the cavities formerly occupied by the pieces of lignite before burning. On account of high strength a relatively large proportion of lignite may be employed, and relatively large particles used, resulting in high porosity and lightness in the finished product. Due also to the high strength of the material, the porosity may be varied within wide limits according to the desired use to which the finished product is to be put, by suitably regulating the size and quantity of the lignite particles employed. The present product also differs radically from any products previously developed in the fact that the pores are large and interconnected. Another novel characteristic of the present product is the ease with which it may be cut, and its property of receiving driven nails or the like, and gripping the same like wood. A structural ceramic unit containing a driven nail which is gripped like wood is believed to be a novel article of manufacture.

What I claim is:

1. A brick having a light-weight burned clay body originally comprised of clay of high silica and low alumina content, lignite high in alkaline content, and bentonite up to 10% by weight of the clay, said body having large interconnected cavities distributed throughout, the walls of the cavities being covered by a coating of fused silica and an alkali.

2. Porous light-weight sound-proof structural ceramic material produced by burning a mixture of 475 parts by weight of clay, 25 parts bentonite and 500 parts lignite, said material having large interconnected pores.

3. A baked ceramic tile derived from clay, lignite and bentonite, said tile being of greyish white color, hardness greater than steel, its surface pitted with holes varying in size from .02 inch to .25 inch, a weight of 9.5 lbs. for a tile 2″ by 12″ by 12″, having a crushing strength of substantially 1800 lbs. per square inch and having interconnected pores.

4. A process for producing light-weight porous structural material of great strength and having large interconnected pores, comprising mixing pulverized clay of high silica and low alumina content with pulverized lignite having high alkali content, all the particles of the lignite ranging from 8–28 mesh and at least 50% of the particles being of less than 12 mesh, moistening the mass sufficiently to render the same plastic, forming the plastic mass into blocks, heating the blocks sufficiently to cause oxidation of the carbonaceous portion of the lignite leaving large interconnected pores, then raising the temperature to a point sufficient to fuse the lignite ash and the silica of the clay to provide a glassy film over the walls of the pores and to vitrify the ware, bentonite being mixed with the clay and lignite to serve as a flux.

5. A process as set forth in claim 4 wherein the oxidation of the lignite commences at 1100° F. and the final vitrifying temperature is approximately 2200° F.

6. A composition of matter adapted to be burned for producing structural material of high porosity and great strength and having large interconnected pores, comprising a mixture of clay of high silica content and low alumina content and a lignite of high alkalinity, the lignite being used in the proportion of 40–70% by weight of the total mixture, its particles being all finer than 8 mesh and coarser than 28 mesh and 75% of the particles being finer than 12 mesh, said composition including also bentonite as a flux.

7. A composition of matter adapted to be burned for the preparation of porous ceramic structural material comprising principally clay and lignite, the lignite being used in a proportion of 40–70% by weight of the total mixture, the clay being of high plasticity, having a vitrification range between approximately 2237° F. and 2768° F., a fusion temperature of 2800° F. to 2900° F., and including as constituents silica 50–70%, alumina 18–25%, iron oxide .5–1.5%, lime .2–.5%, magnesia .3–.7%, and a trace of alkalies, the lignite being of high alkaline content, the particles of lignite varying between .5 inches and .02 inches and an ash content when burned of approximately 5% of the weight of the lignite, and a fusion temperature range between 2000° F. and 2100° F., said composition including also bentonite in the proportion of not to exceed 10% by weight of the clay employed.

8. A composition of matter for the production by burning of porous ceramic structural material having good acoustical properties and having large interconnected pores, comprising clay, lignite and bentonite, the clay having a fusion temperature of cone 22, vitrification point at cone 14, and a composition comprising the following ingredients in substantially the following proportions by weight: silica 66.5%; alumina 23.3%, iron oxide 1.1%, lime .3%, magnesia, .6% and alkalies a trace; the lignite constituting about 50% by weight of the total mixture, its particles being all finer than 8 mesh and coarser than 28 mesh, 75% of the particles finer than 12 mesh and coarser than 20 mesh, said lignite containing about 30% moisture, and about 6.6% ash having the following composition: silica 21.5%, alumina 11.4%, iron oxide 14.4%, lime 19%, magnesia 7.3%, alkalies 10.1%, and a fusion temperature of 2095° F., the clay, bentonite and lignite being employed in the proportions of 475 lbs. clay, 25 lbs. bentonite and 500 lbs. of lignite, the bentonite having a fusion point at cone 7 and approximately the following composition: silica 67.8%, alumina 18.2%, iron oxide 6%, lime 1.9%, magnesia .9% and sodium oxide .65%.

9. A composition of matter adapted to be burned for producing structural material of high porosity and great strength and having large interconnected pores, comprising a mixture of clay of high silica content and low alumina content, lignite of high alkalinity, and bentonite up to 10% by weight of the clay.

10. A brick having a baked clay body having large interconnected pores, said body originally comprising clay permeated by particles of lignite high in alkali content, together with bentonite up to 10% by weight of the clay, the alkali content being adapted for fluxing the clay in baking and forming a glassy film upon the surfaces of the cavities previously occupied by the particles of lignite.

CHARLES WEIGEL.